United States Patent [19]

Katz

[11] B 3,928,636

[45] Dec. 23, 1975

[54] COFFEE EXTRACTION PROCESS
[75] Inventor: Saul N. Katz, Monsey, N.Y.
[73] Assignee: General Foods Corporation, White Plains, N.Y.
[22] Filed: Apr. 30, 1973
[21] Appl. No.: 356,032
[44] Published under the Trial Voluntary Protest Program on January 28, 1975 as document no. B 356,032.

[52] U.S. Cl. .............................................. 426/434
[51] Int. Cl.² ........................................... A23F 1/08
[58] Field of Search .......................... 426/432, 434

[56] References Cited
UNITED STATES PATENTS 2,340,758   2/1944   Kappenberg et al. ................ 426/432
3,655,398   4/1972   Pitchon et al. ....................... 426/434

Primary Examiner—Frank W. Lutter
Assistant Examiner—Neil F. Greenblum
Attorney, Agent, or Firm—Bruno P. Struzzi; Thomas R. Savoie

[57] ABSTRACT

Soluble coffee solids yields from commercial percolation of roasted and ground coffee are increased by feeding aqueous extraction liquid to the spent stage extraction column at temperatures below about 120°F.

7 Claims, No Drawings

COFFEE EXTRACTION PROCESS

BACKGROUND OF THE INVENTION

This invention relates to soluble coffee and more particularly to a process for producing coffee extract.

Percolation is the semi-continuous counter current extraction of soluble coffee solids from roasted and ground coffee. Roasted and ground coffee is contacted with an aqueous extraction liquid in a series of extraction columns called a percolator set. At steady-state operation, the extraction columns of the set contain progressively fresher or less extracted roasted and ground coffee. To begin a given cycle, aqueous extraction liquid is fed to the entrance of the extraction column containing the most extracted or most spent roasted and ground coffee for this cycle (the spent stage). The extraction liquid passes through the column contacting the coffee contained therein and extracting soluble coffee solids therefrom. After exiting this extraction column, the extraction liquid passes through the next successive extraction column containing the next most extracted coffee in the set for this cycle. In a similar manner, the aqueous extraction liquid passes through successive extraction columns containing progressively fresher coffee, the extraction liquid thereby becoming more concentrated in soluble coffee solids. After passing through the extraction column containing the freshest coffee for this cycle (the fresh stage) a predetermined quantity of the extraction liquid is drawn off as coffee extract which is then further processed to soluble coffee powder. Generally, the coffee extract has a concentration of about 20 – 35 percent soluble coffee solids by weight.

To begin a new cycle, the spent stage from the preceeding cycle is taken off-stream and replaced with a column of fresh coffee, thus becoming the fresh stage for coffee extract drawoff in this cycle. The aqueous extraction liquid is fed to the extraction column containing the most spent coffee for this cycle, this coffee being the next most spent or extracted coffee from the preceeding cycle, and the extraction liquid passes through successive columns of progressively fresher coffee as described above. Thus, with each successive cycle, a given charge of roasted and ground coffee becomes progressively more extracted until it is finally taken off-stream.

Prior art workers in this area have long recognized the desirability of increasing the yield (defined as percent of coffee solids in the drawn-off coffee extract based on the dry solids in the fresh stage extraction column) from the overall percolation process without damaging the sensitive coffee flavors and aromas. A recognized method of increasing yields is through hydrolysis or the production of hydrolyzed coffee solids. Thus as a given charge of coffee becomes more spent, hydrolyzed coffee solids are generated by operating the extraction process at temperatures and pressure sufficient to effect hydrolysis.

In general, hydrolyzed (or autoclaved) coffee solids are generated in the spent section of the percolator set by feeding a relatively hot aqueous extraction liquid to the spent stage and passing this heated extraction liquid through the next few successive extraction columns containing progressively fresher but still relatively extracted roasted and ground coffee. In the latter portion of the percolator set the extraction liquid is cooled before passing through the fresher roasted and ground coffee. This cooling can be done using a heat exchange apparatus but, if the extraction liquid has lost sufficient heat in the early stages of percolation, it may be unnecessary to cool the liquid at all. This cooler liquid is used to extract soluble coffee solids from the roasted and ground coffee without seriously impairing the desirable aromas and flavors associated with these fresher charges of coffee. Thus, a given charge of fresh coffee will undergo extraction designed to extract coffee solids under relatively mild conditions during its first few cycles on-stream and then undergo a predominately hydrolyzing operation in its remaining cycles on stream. The net result, ideally, is that the charge of coffee has had its more flavorful components extracted with as little damage as possible and then has had its yield maximized during hydrolysis.

While the above-described process has gained wide acceptance in the art there is still a need for further increasing the yield for the overall percolation process.

SUMMARY OF THE INVENTION

It has been found the soluble coffee solids yields from commercial percolation of roasted and ground coffee can be increased by feeding aqueous extraction liquid to the spent stage extraction column at temperatures below about 120°F.

Normal feed temperatures for aqueous extraction liquid are generally in the range of from about 300°F to 350°F in order to generate the maximum amount of hydrolyzed coffee solids and thus obtain the maximum yield of coffee solids from a given charge of fresh coffee.

It has been found that a significant portion of the hydrolyzed coffee solids produced are not carried away by the aqueous extraction liquid but rather remain within stagnant channels within the packed bed of roasted and ground coffee particles. When the spent stage is taken off-stream, i.e., the spent coffee is discharged, hydrolyzed coffee solids generated in either the spent or next few successive columns where hydrolysis products are produced are lost. Thus even though yield increases are noted, it has been found that even further increases are obtainable if these hydrolyzed solids are as nearly as possible recovered.

It is found that feeding aqueous extraction liquid to the spent stage extraction column at temperatures below about 120°F achieves a more efficient "washing" of extracted coffee solids bound up with the roasted and ground coffee. At normal feed temperature of 300°F – 350°F, the extraction liquid has a low density and a low viscosity. In coffee extraction it is found that such conditions result in channelling in the coffee bed, i.e., the extraction liquid follows certain defined paths through the column of coffee bypassing and thereby inefficiently washing certain portions of the coffee bed. Employing the process of this invention, the density and viscosity of the extraction liquid are significantly increased resulting in a "plug" flow arrangement which minimizes channelling and thereby more efficiently contacts and washes the roasted and ground coffee and displaces the soluble solids in the stagnant channels of the coffee bed.

According to specific embodiments of this invention, the entire feed liquid may be at temperatures below 120°F or only the later portion, a volumetric amount sufficient for effective washing may be below 120°F. After passing through the spent stage, this cooler extraction liquid can be heated to normal extraction temperatures using a heat exchange apparatus.

Another advantage of this invention is that since higher yields can be generated using the process of this invention, production of yields equivalent to standard percolation can be obtained using a relatively milder extraction temperature profile. Operating in such a manner has been found to result in an overall flavor improvement in the coffee extract.

The roasted and ground coffee of this invention may be a single variety of coffee or a blend of coffee varieties. The coffee may be either decaffeinated or undecaffeinated coffee.

DETAILED DESCRIPTION OF THE INVENTION

According to the process of this invention, the aqueous extraction liquid, which is generally water but may be any solution of salts or coffee solids, is fed to the spent stage extraction column of the percolator set, containing the most extracted coffee in the set, at temperatures below about 120°F. Preferably, the temperature should be below about 100°F and most preferably between about 35°F and 70°F. The spent coffee contacted with this extraction liquid has had a major portion of its soluble solids extracted in previous cycles but, as previously mentioned, is found to contain solubilized solids which have not been transferred to and carried off by the aqueous extraction liquid. It is found that in standard percolation, utilizing feed temperatures in excess of 300°F, few of these solubilized solids are carried off in the spent stage due to channelling and poor liquid distribution through the bed of coffee particles. Using the process of this invention, whereby channelling is minimized, greater quantities of these already solubilized solids are picked up or displaced by the extraction liquid.

After passing through the spent stage, the aqueous extraction liquid is heated using a suitable heat exchange apparatus, to temperatures around 300°F and higher before passing into the column containing the next most spent coffee for this cycle. Depending, of course, upon the number of extraction columns contained in the percolator set, the next few passes of extraction liquid through successive columns containing coffee of increasing freshness generate predominately hydrolyzed solids while the passes through the later columns, containing fresher coffee, extract solids extractable at normal temperatures and pressures.

It is generally preferred to draw the coffee extract off from the fresh stage at temperatures below about 210°F and intercolumn heaters and coolers can be used according to methods known in the art towards this end.

In one embodiment of this invention, the entire feed liquid is fed to the spent stage extraction column at a temperature below about 120°F and preferably between about 35°F – 70°F. The liquid exiting from the spent stage is then heated to above 300°F and preferably to between 320°F and 350°F before passing through the next successive extraction column. It will be noted, of course, that contacting the spent stage coffee with liquid at such low temperatures will generate little, if any, hydrolyzed coffee solids. However, it is found that such losses are minimal compared to the amount of already solubilized solids picked up by the feed extraction liquid, heretofore left behind and lost at normal extraction temperatures. Still further, a substantial quantity of hydrolyzed solids are generated in the next successive stage wherein the next most extracted coffee is contacted with the now heated aqueous extraction liquid exiting from the spent stage. The net effect is that the yield for the entire process is increased, i.e., more soluble solids are extracted from a given charge of fresh coffee.

In an alternate embodiment of this invention, the initial portion of the feed extraction liquid is fed to and through the spent stage at normal percolation temperatures. The last or latter portion of the liquid to be fed to the spent stage is at a temperature of below about 120°F and preferably below about 75°F to 100°F. In this embodiment, then, hydrolyzed solids are generated in the spent stage extraction column via contacting with the initial portion of the feed extraction liquid. The latter, cooler portion of the feed extraction liquid then is used to efficiently "wash" both the solubilized solids just generated together with solids generated in previous cycles but not carried off by the extraction liquid.

In this embodiment it is found that the energy balances for the latter portion of the percolator set are substantially unaffected by the feeding of this cooler liquid. Thus heating the exiting liquor to above 300°F is generally unnecessary in this embodiment. Further, then, apart from the yield increases resulting from operating the percolation process in such a manner, an energy saving is realized by virtue of not having to heat this latter portion of the extraction liquid before feeding it to the spent stage nor after it exits from the spent stage. Of course, if desired (for example, if the latter, cooler portion is large enough to effect the energy balances for the remainder of the percolator set) the exiting liquid from the spent stage can be heated.

The amount of cool extraction liquid needed to effect this improved washing may vary widely according to the particular needs of the process. Ideally, the amount should be the volumetric capacity needed to displace nearly all the previous hotter liquid in the spent stage which amount can be determined based on the feed liquid rate, the extractor capacity, and other like factors. In general it is found that the ratio of cold feed to total feed (hot + cold), based on the total gallons fed to the spent stage can be as low as about 1:6 to maximums of about 1:3.

Once the final coffee extract is drawn-off from the fresh stage, it can be further processed to soluble coffee powder using spray-drying, freeze-drying or other like drying methods. Concentration and/or aroma stripping of the extract prior to drying may be practiced according to methods well-known in the art.

By virtue of the process of this invention, yields for the percolation process are increased without impairing the flavor of the final coffee extract or lessening its concentration. Thus the process affords an excellent, efficient, more economical coffee extraction process than heretofore achievable.

As previously mentioned, use of the process of this invention can result in a flavor improvement in the drawn-off coffee extract and soluble coffee powder prepared therefrom. It is found that by virtue of the improved extraction efficiency resulting from this invention, yields equivalent to those obtained in standard percolation can be achieved using a relatively milder (lower) temperature profile throughout the percolator set. As such, less heat damage is done to the roasted and ground coffee, and fewer volatile aromatics and flavor notes are lost. The net result has been judged to be an improved flavor yet at economical yields and concentrations.

The process of this invention can be illustrated by the following example. A six-column percolator set containing, at steady-state, roasted and ground coffee of increasing freshness (less extraction) progressing from the spent stage to the fresh stage was employed. Water at 350°F was fed to the spent stage extraction column at 350°F for 29 minutes at 1.8 gallons/minute. The temperature of this feedwater was then lowered to about 110°F for the last six minutes before taking the column off-stream. Percolation then proceeded as normal. The temperature profile comparison of a standard percolation run, wherein the feedwater was maintained at 350°F for the entire feed time, versus the process of this invention was as follows:

AVERAGE TEMPERATURE OUT OF COLUMN

| Column | Control | Experimental |
|---|---|---|
| Fresh | 197°F | 190°F |
| 2nd | 237°F | 204°F |
| 3rd | 278°F | 223°F |
| 4th | 313°F | 267°F |
| 5th | 322°F | 304°F |
| Spent | 332°F | 307°F |

The average yield for both the control and experimental runs was 40 percent by weight. The coffee extract produced in the experimental run, by virtue of the lower temperature profile needed to obtain equivalent yields, was judged by expert tasters to be of better flavor and quality when compared against the control extract.

Thus, the process of this invention, by increasing the overall extraction efficiency, can be used to increase yields for the overall extraction process or to improve coffee extract quality while obtaining yields equivalent to those obtained in standard percolation.

While this invention has been described with respect to specific operating examples and embodiments it will be apparent to those skilled in the art that obvious variations may be practiced without departing from the scope and spirit of this invention and the appended claims.

I claim:

1. In a method for producing coffee extract wherein progressively fresher roasted and ground coffee is countercurrently contacted with an aqueous extraction liquid in the extraction columns of a percolator set and wherein said extraction liquid is fed to the spent stage extraction column containing the most extracted coffee and drawn off from the fresh stage extraction column containing the least extracted coffee, the improvement comprising feeding the entire portion of the aqueous extraction liquid fed to said spent stage extraction column at temperatures below about 120°F, and heating the exiting extraction liquid from said spent stage extraction column to above 300°F before contacting the next progressively fresher coffee.

2. The method of claim 1 wherein said temperature of said feed extraction liquid is below about 75°F.

3. The method of claim 2 wherein said temperature of said feed extraction liquid is between about 35°F to 70°F.

4. In a method for producing coffee extract wherein progressively fresher roasted and ground coffee is countercurrently contacted with an aqueous extraction liquid in the extraction columns of a percolator set and wherein said extraction liquid is fed to the spent stage extraction column containing the most extracted coffee and drawn off from the fresh stage extraction column containing the least extracted coffee, the improvement comprising feeding a portion of aqueous extraction liquid to said spent stage extraction column at temperatures below about 120°F, wherein only the latter portion of said aqueous extraction liquid fed to said spent stage extraction column is below about 120°F, while the earlier portion is above about 300°F, wherein the volume of said latter portion is in the ratio of between about 1:6 to 1:3 based on the volumetric amount of total feed to said spent stage extraction column.

5. The method of claim 4 wherein said latter portion of said aqueous extraction liquid is the volumetric amount of said liquid needed to displace nearly all the previous liquid in said spent stage extraction column.

6. The method of claim 4 wherein said temperature of said latter portion of said aqueous extraction liquid is below about 75°F.

7. The method of claim 6 wherein said temperature of said latter portion of said aqueous extraction liquid is between about 35°F to 70°F.

* * * * *